(12) United States Patent
Suzuki

(10) Patent No.: US 8,347,139 B2
(45) Date of Patent: Jan. 1, 2013

(54) POWER SUPPLY CONTROL DEVICE, A STORAGE SYSTEM, A CONTROL METHOD OF THE POWER SUPPLY CONTROL DEVICE, A CONTROL METHOD OF A DISK ARRAY UNIT AND A COMPUTER READABLE MEDIUM THEREOF

(75) Inventor: Ryo Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 19 days.

(21) Appl. No.: 12/885,262

(22) Filed: Sep. 17, 2010

(65) Prior Publication Data

US 2011/0066884 A1    Mar. 17, 2011

(30) Foreign Application Priority Data

Sep. 17, 2009   (JP) .................................. 2009-216119

(51) Int. Cl.
*G06F 11/00* (2006.01)

(52) U.S. Cl. ............................ 714/14; 714/6.2; 714/6.21

(58) Field of Classification Search ................... 714/4.1, 714/6.2, 6.21, 24, 42
See application file for complete search history.

(56) References Cited

U.S. PATENT DOCUMENTS

| 7,406,623 | B2 * | 7/2008 | Takahashi et al. | 714/14 |
| 2003/0065972 | A1 * | 4/2003 | Yamamoto et al. | 714/4 |
| 2005/0132256 | A1 * | 6/2005 | Watanabe et al. | 714/42 |
| 2005/0240814 | A1 * | 10/2005 | Sasakura et al. | 714/14 |
| 2005/0270927 | A1 * | 12/2005 | Hayashi | 369/47.1 |
| 2009/0144568 | A1 * | 6/2009 | Fung | 713/300 |

FOREIGN PATENT DOCUMENTS

| JP | 2000-357059 A | 12/2000 |
| JP | 2003-150415 A | 5/2003 |

* cited by examiner

*Primary Examiner* — Joseph D Manoskey
(74) *Attorney, Agent, or Firm* — Sughrue Mion, PLLC

(57) ABSTRACT

A power supply control device including: a control unit which controls power supplied from a first device to a disk array unit accessible from host devices through a network device; and a second device which supplies power to the disk array unit and the power supply control device when the power supply from the first device is disconnected, the control unit including: a collecting unit which collects power supply fault information regarding at least one of the host devices and the network device; a starting unit which starts power supply from the second device when power supplied from the first device is disconnected; and a transmitting unit which transmits a notification to the disk array unit in response to collection of power supply fault information after starting the power supply from the second device, the notification indicating that the power supplied from the first device is disconnected.

21 Claims, 6 Drawing Sheets

POWER SUPPLY CONTROL DEVICE, A STORAGE SYSTEM, A CONTROL METHOD OF THE POWER SUPPLY CONTROL DEVICE, A CONTROL METHOD OF A DISK ARRAY UNIT AND A COMPUTER READABLE MEDIUM THEREOF

This application is based upon and claims the benefit of priority from Japanese patent application No. 2009-216119, filed on Sep. 17, 2009, the disclosure of which is incorporated herein in its entirety by reference.

BACKGROUND

The embodiments of the present invention relate to a power supply control device, a storage system, a control method of the power supply control device, a control method of a disk array unit and a computer readable medium thereof. More particularly, it relates to a method for controlling power supply of a disk array unit that can perform multi-platform connection with a plurality of host devices with different power supply control specifications.

In order to improve the response of write processing from a host device, the disk array unit notifies the host device of writing completion when the disk array unit completes writing data in cache memory. The disk array unit writes data held in the cache memory to a hard disk drive when the host device is not writing other data in the cache memory.

For this reason, the disk array unit has a battery, etc. in preparation for when electric power is not supplied to the disk array unit due to a power failure, etc. in a state where data exists in the cache memory. The disk array unit backs up the data held in the cache memory by using the battery.

Examples of the disk array unit technology are disclosed below.

Patent Document 1 discloses a disk array unit which has a cache saving area of a recording medium that is formed in an area that is different from a user data area of the recording medium. When a power failure occurs, the disk array unit copies contents of the cache memory into the cache saving area of the recording medium by using a back up power supply.

Patent Document 2 discloses that a management device manages an external storage device of the disk array unit by using simple network management protocol (SNMP). Patent Document 2 also discloses that when abnormalities occur in a main power supply of the external storage device, the disk array unit supplies electric power from an auxiliary power supply to a semiconductor memory, a hard disk, and a control unit.

[Patent Document 1] JP-A-2000-357059
[Patent document 2] JP-A-2003-150415

In Patent Document 1 and Patent Document 2, the uninterruptible power supply device supplies electric power when a power supply failure of the disk array unit occurs. However, software for controlling the uninterruptible power supply device is needed, and the specification for controlling the uninterruptible power supply differs according to the company that makes the uninterruptible power supply. For this reason, there is a problem that, when managing the plurality of host devices and the disk array units with different power supply control specifications collectively, management of the power supply is very complicated.

A purpose of certain embodiments of the present s is to provide a power supply control device which can easily control the power supply of a storage system that comprises a plurality of host devices and disk array units with different power supply control specifications and which does not lose the data held in the cache memory.

SUMMARY OF THE INVENTION

An exemplary object of the embodiments of the present invention is to provide a power supply control device, a storage system, a control method of the power supply control device, a control method of a disk array unit and a computer readable medium thereof in order to easily control the power supply of the storage system that comprises a plurality of host devices and disk array units with different power supply control specifications and which does not lose the data held in the cache memory.

According to one aspect of the embodiments of the present invention, a power supply control device comprising: a power supply control unit configured to control electric power supplied from a first power supply device to a disk array unit which is accessible from a plurality of host devices through a network device and from the power supply control device, at least two of the plurality of host devices operate with different power supply control specifications, and a second power supply device configured to supply electric power to the disk array unit and the power supply control device when the electric power supply from the first power supply device is disconnected, wherein the power supply control unit comprises: a collecting unit configured to collect power supply fault information indicating a power supply failure of at least one of the plurality of host devices and the network device, wherein the power supply fault information is transferred according to a management control protocol which controls both the plurality of host devices and the network device; a starting unit configured to start the supply of the electric power from the second power supply device when the electric power supplied from the first power supply device is disconnected; and a transmitting unit configured to transmit a notification to the disk array unit in response to the collection of the power supply fault information according to the management control protocol after starting the electric power supply from the second power supply device, wherein the notification indicates that the electric power supplied from the first power supply device is disconnected.

According to one aspect of the embodiments of the present invention, a power supply control method of a power supply control device, comprising: controlling electric power supplied from a first power supply device to a disk array unit which is accessible from a plurality of host devices through a network device and from the power supply control device, at least two of the plurality of host devices operate with different power supply control specifications, in a power supply control step, and supplying electric power to the disk array unit and the power supply control device when the electric power supply from the first power supply device is disconnected in a second power supply steps, wherein the power supply control step comprises: collecting power supply fault information indicating a power supply failure of at least one of the plurality of host devices and the network device in a collecting step, wherein the power supply fault information is transferred according to a management control protocol which controls both the plurality of host devices and the network device; starting the supply of the electric power from the second power supply device when the electric power supplied from the first power supply device is disconnected in a starting step; and transmitting a notification to the disk array unit in response to the collection of the power supply fault information according to the management control protocol after starting the electric power supply from the second power supply device in a transmitting step, wherein the notification indicates that the electric power supplied from the first power supply device is disconnected.

According to one aspect of the embodiments of the present invention, a control method of a disk array unit, wherein the disk array unit comprises a first controller and a plurality of disks and is connected to a power supply control device which controls a first power supply device and a second power supply device, comprising: a host control unit collecting I/O (Input/Output) commands from a plurality of host devices; a disk control unit controlling transmission/reception of the data with the disks; storing the data in a cache memory; and processing the I/O commands which the host control unit has collected when the notification is received from the power supply control device, wherein the notification indicates that the electric power supplied from the first power supply device is disconnected, stopping power supplied from the second power supply device to the host control unit and the disk control unit after all the I/O commands the processing unit has collected have been processed, in a stopping step, saving the data stored in the cache memory to a predetermined recording medium in the disk array unit after the stopping step, and transmitting a request to the power supply control device, wherein the request is for stopping the power supply from the second power supply device to the disk array units in response to saving the data stored in the cache memory to the disk array unit.

According to one aspect of the embodiments of the present invention, a computer readable medium recording thereon a program for enabling computer to execute a power supply control method of a power supply control device, the power supply control method comprising: controlling electric power supplied from a first power supply device to a disk array unit which is accessible from a plurality of host devices through a network device and from the power supply control device, at least two of the plurality of host devices operate with different power supply control specifications, in a power supply control step, and supplying electric power to the disk array unit and the power supply control device when the electric power supply from the first power supply device is disconnected in a second power supply steps, wherein the power supply control step comprises: collecting power supply fault information indicating a power supply failure of at least one of the plurality of host devices and the network device in a collecting step, wherein the power supply fault information is transferred according to a management control protocol which controls both the plurality of host devices and the network device; starting the supply of the electric power from the second power supply device when the electric power supplied from the first power supply device is disconnected in a starting step; and transmitting a notification to the disk array unit in response to the collection of the power supply fault information according to the management control protocol after starting the electric power supply from the second power supply device in a transmitting step, wherein the notification indicates that the electric power supplied from the first power supply device is disconnected.

According to one aspect of the embodiments of the present invention, a power supply control device comprising: a power supply control means for controlling electric power supplied from a first power supply device to a disk array unit which is accessible from a plurality of host devices through a network device and from the power supply control device, at least two of the plurality of host devices operate with different power supply control specifications, and a second power supply device configured to supply electric power to the disk array unit and the power supply control device when the electric power supply from the first power supply device is disconnected, wherein the power supply control means comprises: a collecting means for collecting power supply fault information indicating a power supply failure of at least one of the plurality of host devices and the network device, wherein the power supply fault information is transferred according to a management control protocol which controls both the plurality of host devices and the network device; a starting means for starting the supply of the electric power from the second power supply device when the electric power supplied from the first power supply device is disconnected; and a transmitting means for transmitting a notification to the disk array unit in response to the collection of the power supply fault information according to the management control protocol after starting the electric power supply from the second power supply device, wherein the notification indicates that the electric power supplied from the first power supply device is disconnected.

BRIEF DESCRIPTION OF THE DRAWINGS

Other features and advantages of various embodiments of the present invention will become apparent by the following detailed description and the accompanying drawings, wherein.

DETAILED DESCRIPTION

A first exemplary embodiment of the present invention will be described in detail below.

(1) First Exemplary Embodiment

Figure 1:
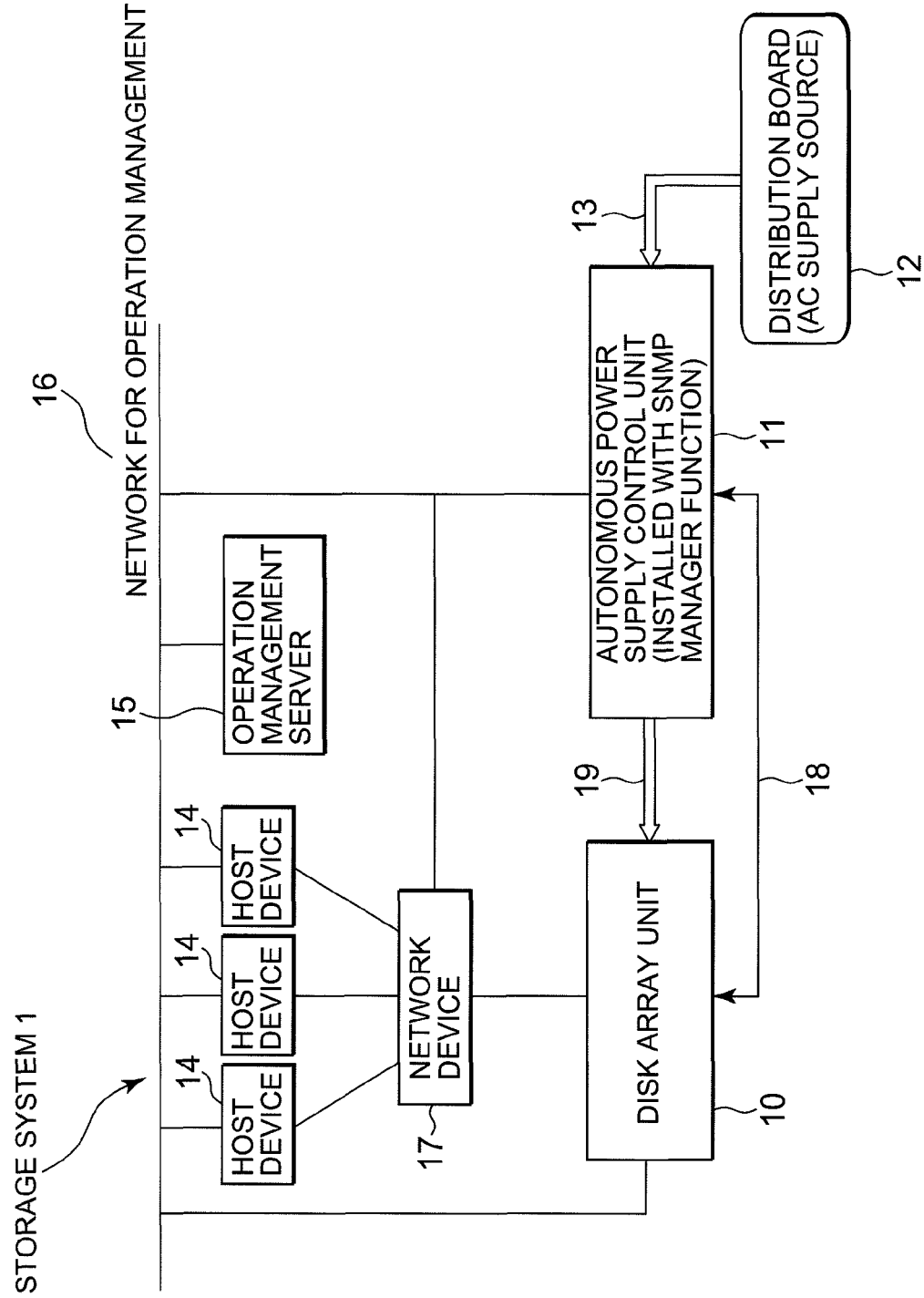
FIG. 1 is a block diagram showing a configuration of a storage system of a first exemplary embodiment of the invention.

FIG. 1 is a block diagram showing a configuration of a storage system 1 of the first exemplary embodiment. In this embodiment, a disk array unit 10 has an independent unit for supplying electric power to the disk array unit 10.

The storage system 1 comprises the disk array unit 10, an autonomous power supply control unit 11 (a power supply control device 11), a distribution board 12 (a first power supply 12), a plurality of host devices 14, such as host computers, an operation management server 15, and a network device 17.

The autonomous power supply control unit 11 is installed with simple network management protocol (SNMP) manager function, and operates as a SNMP manager. Moreover, the host device 14, the operation management server 15 and the network device 17 operate as SNMP agents.

The autonomous power supply control unit 11 is supplied with electric power from the distribution board 12 via a power cable 13. The disk array unit 10 is supplied with electric power via the autonomous power supply control unit 11 and via a power cable 19.

The disk array unit 10, the autonomous power supply control unit 11, the host devices 14, the operation management server 15 and the network device 17 are connected by a network for operation management 16. Moreover, the disk array unit 10 and the autonomous power supply control unit 11 are connected by a storage area network (SAN) that includes, for example, the network device 17.

The disk array unit 10 and the autonomous power supply control unit 11 are connected by an interface 18, and are enabled to communicate each other.

Figure 2:
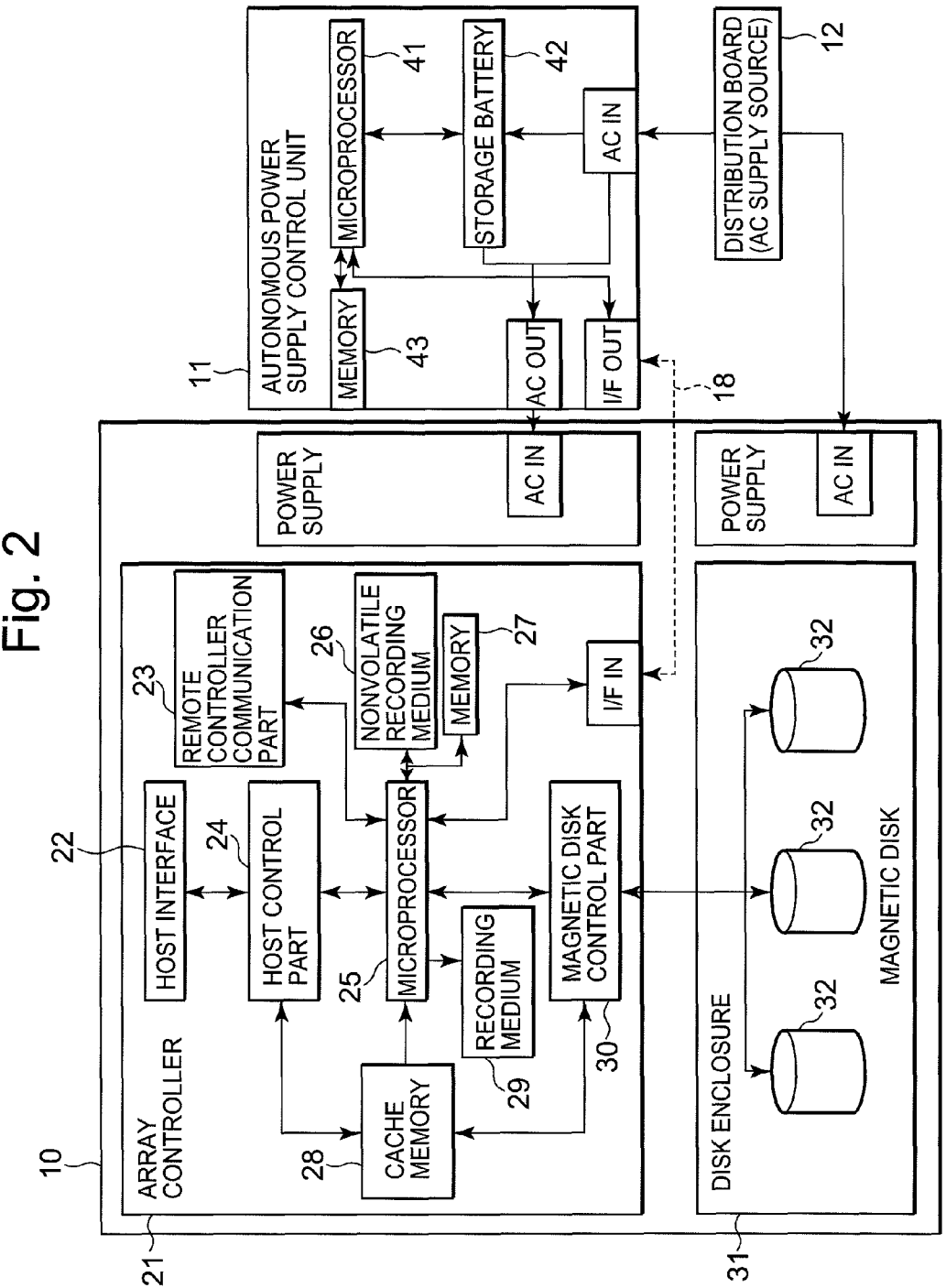
FIG. 2 is a block diagram showing a configuration of a disk array unit 10 and an autonomous power supply control unit 11.

FIG. 2 is a block diagram showing a configuration of the disk array unit 10 and the autonomous power supply control unit 11.

The disk array unit 10 is a device that comprises an array controller 21 (a first controller 21) and a disk enclosure 31. Electric power for the array controller 21 is supplied from the distribution board 12 through the autonomous power supply control unit 11 and a power supply. Electric power for the disk enclosure 31 is supplied from the distribution board 12 through another power supply.

The array controller 21 comprises an host interface 22, a remote-controller communication part 23, a host control unit such as a host control part 24, a control unit such as a microprocessor 25, a nonvolatile recording medium 26, memory 27, cache memory 28, a recording medium 29, a disk control unit such as a magnetic disk control part 30, etc. Moreover, the disk enclosure 31 comprises a plurality of magnetic disks 32.

The remote-controller communication part 23 is connected with another array controller (not illustrated) in the disk array unit 10. In this embodiment, the other array controller is referred to as a second controller. The second controller has a redundant structure to the first controller and can communicate with the first controller.

The microprocessor 25 receives the data transmitted from the host device 14 and stores it in the cache memory 28 based on an I/O (Input/Output) command from the host device 14, and subsequently stores the data in the magnetic disk 32. Moreover, based on the I/O command from the host device 14, the microprocessor 25 reads the corresponding data from the magnetic disk 32, stores it in the cache memory 28, and subsequently transmits the data to the host device 14.

The autonomous power supply control unit 11 comprises a power supply control unit such as a microprocessor 41, a second power supply device such as a storage battery 42 or another type of electrical energy storage device such as a capacitor, a memory 43, etc.

The autonomous power supply control unit 11 is installed with an SNMP manager function, as described above. The autonomous power supply control unit 11 validates the SNMP manager function at the time when the SNMP manager starts to operate. Moreover, at the time of initialization, the autonomous power supply control unit 11 sets up network information for an SNMP agent group of the host devices 14, the operation management server 15, the network device 17, etc. The autonomous power supply control unit 11 also makes a management table with the SNMP agent group network information.

Figure 3:
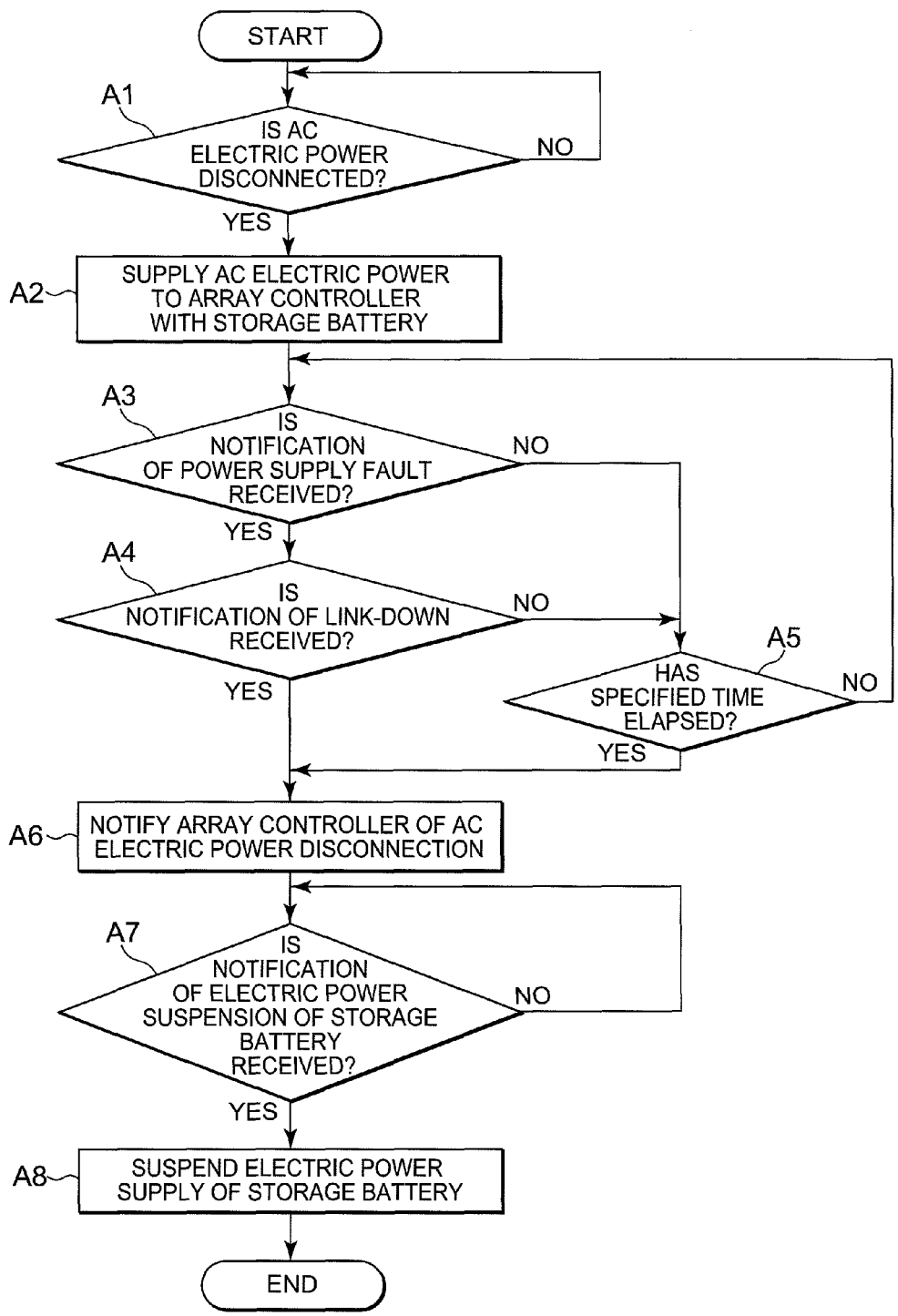
FIG. 3 is a flowchart showing a power supply control procedure of the autonomous power supply control unit 11 at the time of AC (Alternating Current) power supply disconnection.

Next, the autonomous power supply control unit 11 processing when AC (Alternating Current) electric power from the distribution board 12 is disconnected will be explained with reference to the flowchart of FIG. 3. FIG. 3 is a flowchart showing a power supply control procedure of the autonomous power supply control unit 11 at the time of AC power supply disconnection.

Since the storage battery 42 is always supplied with electric power from the distribution board 12, the microprocessor 41 monitors an electric power supply state of the distribution board 12 by communicating with the storage battery 42. The microprocessor also monitors a supply state of AC electric power to the disk array unit 10 and the autonomous power supply control unit 11.

When the microprocessor 41 recognizes that the AC electric power supply from the distribution board 12 was disconnected by the monitoring described above (Step A1: YES), the storage battery 42 starts supplying electric power from the storage battery 42 to the disk array unit 10 and the autonomous power supply control unit 11 (Step A2).

Next, the microprocessor 41 determines whether or not a fault notification (SNMP Trap) was received from the SNMP agents such as the host device 14, the operation management server 15 and the network device 17. (Steps A3, A4).

Specifically, the microprocessor 41 determines whether the fault notification (SNMP Trap) was received from the host devices 14 and/or the operation management server 15 (Step A3). Subsequently, when the fault notification is received from the host devices 14 and/or the operation management server 15 (Step A3: YES), the microprocessor 41 determines whether a link-down notification (the fault notification) was received from the network device 17 (Step A4).

In this way, in order to determine whether an AC electric power disconnection notification is to be transmitted to the array controller 21, the microprocessor 41 determines simultaneously whether the microprocessor 41 has received the fault notification from the host devices 14 and/or the operation management server 15 and whether the microprocessor 41 has received the link-down notification (the fault notification) from the network device 17. The following are the reasons. For example, it is difficult to detect a change of a link state of the network because the host device 14 sends a fault notification to the autonomous power supply control unit 11 when a fault occurs in the host device 14 alone. Also, when the host device 14 accesses the disk array unit 10 via the network device 17, the host control part 24 cannot detect a change in the link state of the network.

Next, when the link-down notification is received from the network device 17 (Step A4: YES), the microprocessor 41 proceeds to Step A6.

On the other hand, if the microprocessor 41 does not receive the fault notification from all the SNMP agents that are management objects (Step A3: NO), or if the microprocessor 41 does not receive the notification of link-down from the network device 17 (Step A4: NO), the microprocessor 41 determines whether a specified time has elapsed after the AC electric power supply from the distribution board 12 is disconnected (Step A5).

That is, arrival of the fault notification is checked taking a specified wait time into consideration. This specified wait time is calculated based on power consumption of the disk array unit 10 and a capacity of the storage battery 42, a capacity of the cache memory 28 of the disk array unit 10 and/or a data transfer rate from the cache memory 28 to the recording medium 29, etc. The microprocessor 41 waits to receive the notification during the specified time (Step A5). When the specified time has elapsed (Step A5: YES), the microprocessor 41 proceeds to Step A6.

Next, the microprocessor 41 transmits the AC electric power disconnection notification to the array controller 21 through the interface 18 (Step A6).

Subsequently, the microprocessor 41 waits to receive a notification of electric power suspension of the storage battery 42 from the array controller 21 (Step A7). After that, when the notification of electric power suspension of the storage battery 42 is received from the array controller 21 (Step A7: YES), the microprocessor 41 suspends the electric power supply from the storage battery 42 to the array controller (Step A8).

Figure 4:
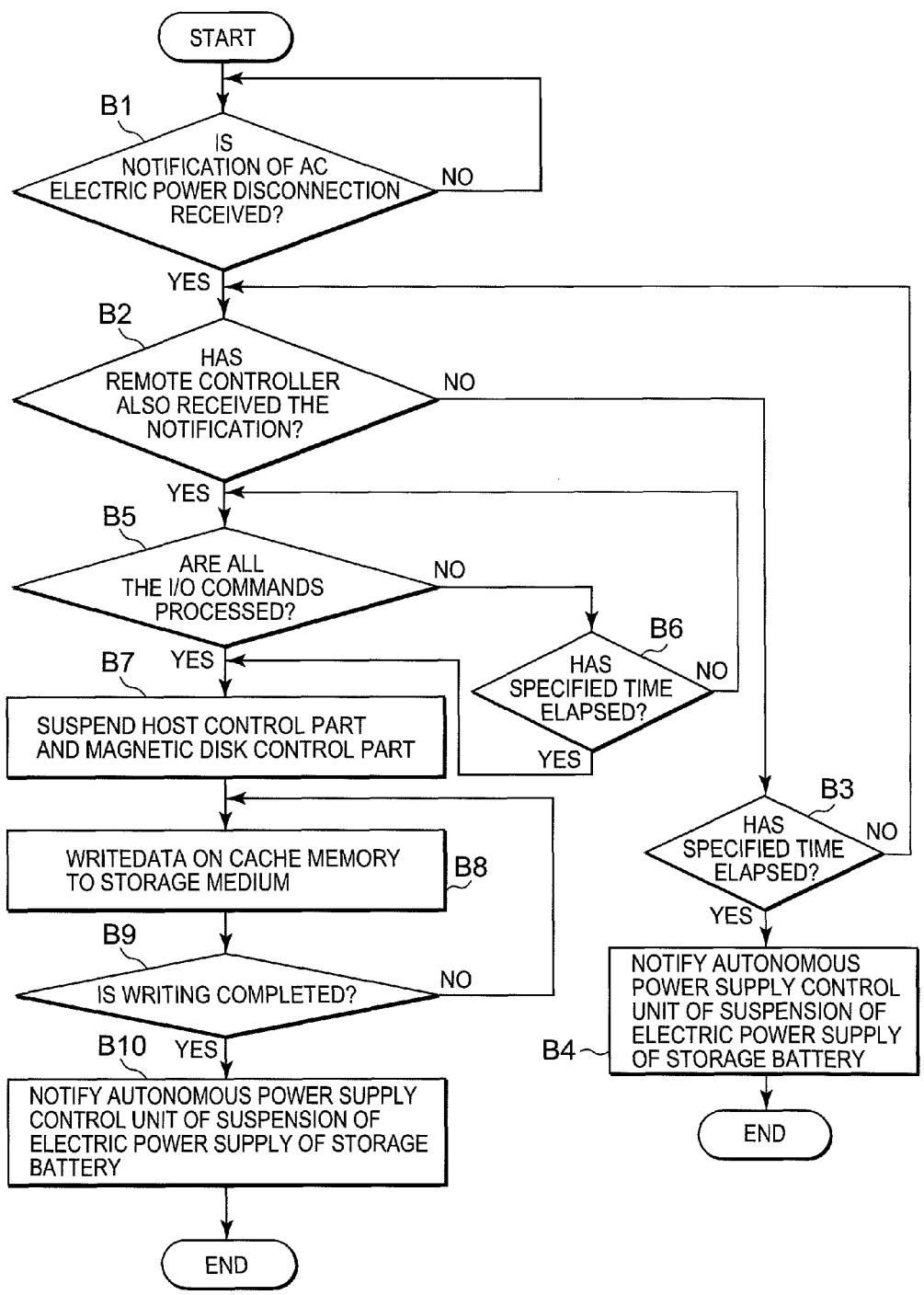
FIG. 4 is a flowchart showing a power supply control procedure of an array controller 21 at the time of AC supply disconnection.

Next, processing by the array controller 21 after receiving the AC electric power disconnection notification will be explained with reference to the flowchart of FIG. 4. FIG. 4 is a flowchart showing a power supply control procedure of an array controller 21 at the time of AC supply disconnection.

If the AC electric power disconnection notification is received from the autonomous power supply control unit 11 (Step B1: YES), in the case of a redundant controller configuration, the microprocessor 25 checks whether the second controller also received the AC electric power disconnection notification through the remote-controller communication part 23 (Step B2).

Subsequently, if the second controller has not received the AC electric power disconnection notification (Step B2: NO), microprocessor 25 waits for the above specified time to elapse after the AC electric power supply from the distribution board 12 was disconnected (Step B3). Then, when the specified time has elapsed (Step B3: YES), the microprocessor 25 determines that the other array controller operates normally, and issues the notification of electric power suspension of the storage battery 42 to the autonomous power supply control unit 11 in order to prevent wasted discharge of the storage battery 42 (Step B4).

When the specified time has elapsed, the autonomous power supply control unit 11 transmits the AC electric power disconnection notification (Step A5, A6). Therefore, in the case where the second controller is connected to the control unit with a function equivalent to the autonomous power supply control unit 11, if the AC electric power disconnection notification is not received even when the specified time has elapsed (Step B2, B3), the microprocessor 25 determines that power supply of the second controller is not disconnected and the second controller is operating normally.

On the other hand, if the second controller also received the AC electric power disconnection notification (Step B2: YES), the microprocessor 25 checks whether the host control part 24 of the array controller 21 received the I/O commands from the host devices 14 and whether or not all the I/O commands were processed (Step B5). At this time, if the network device 17 is in a state of link-down, the I/O command corresponds to the I/O command that the host control part 24 received before the AC electric power disconnection and is being processed.

Then, if all the I/O commands have not been processed in the host control part 24 of the array controller 21 (Step B5: NO), the microprocessor 25 waits until the specified time elapses after the AC electric power supply from the distribution board 12 was disconnected (Step B6). Then, when the specified time has elapsed (Step B6: YES), the microprocessor 25 proceeds to Step B7.

On the other hand, when all the I/O commands have been processed by the host control part 24 of the array controller 21 (Step B5: YES), the microprocessor 25 proceeds to Step B7.

Next, in order to suppress discharge from the storage battery 42, the microprocessor 25 disconnects power supplies of the host control part 24 and the magnetic disk control part 27, and also suspends the electric power supply to the host control part 24 and the magnetic disk control part 27 (Step B7).

Subsequently, the microprocessor 25 starts writing the data in the cache memory 28 to the recording medium 29 (Step B8). Then, when the writing of all the data in the cache memory 28 to the recording medium 29 has completed (Step B9: YES), the microprocessor 25 issues a notification of electric power suspension of the storage battery 42 to the autonomous power supply control unit 11 (Step B10).

Thereby, the microprocessor 25 can save the data in the cache memory 28 to the recording medium 29 quickly and safely while suppressing wasted discharge of the storage battery 42. When the microprocessor 25 restarts the disk array unit 10 after the AC electric power supply from the distribution board 12 is restored, the microprocessor 25 can transmit the data in the recording medium 29 to the cache memory 28, and resume the processing of the host devices 14.

In this way, in the storage system 1 of this embodiment, the SNMP manager function and the storage battery 42 are installed in the autonomous power supply control unit 11. Also, the disk array unit 10 has recording medium 29. Moreover, in the storage system 1, the disk array unit 10, the autonomous power supply control unit 11, the host device 14, the operation management server 15, and the network device 17 are connected to the network 16 for operation management. Then, in the storage system 1, the autonomous power supply control unit 11 functions as the SNMP manager. And the host device 14, the operation management server 15, and the network device 17 function as the SNMP agents. At the time of occurrence of power supply fault and at the time of occurrence of link-down, the SNMP agent notifies the SNMP manager of the fault. Then the SNMP manager performs power supply control based on the notification of fault.

Therefore, it is possible for a plurality of host devices with different power supply control specifications to perform the power supply control of the disk array unit without being conscious of each company's own power supply control specification, and with minimum structure.

Then, as explained above, the embodiment of the present invention has an effect as will be described below. The first effect is that in the disk array unit 10 in which a plurality of host devices 14 with different power supply control specifications are multi-platform connected, at the time of occurrence of a power failure, etc., the I/O commands from the host devices 14 are saved as data in the cache memory 29 for improving a writing response after I/O commands are processed as much as possible. The second effect is that it requires neither special-purpose software nor a special-purpose device, and processing of power supply disconnection is performed safely.

Incidentally, the reasons why the autonomous power supply control unit 11 is independent are to achieve miniaturization of the array controller 21, and to deal with the situation where the power supply control is not necessary because a constant voltage and constant frequency power supply (CVCF: Constant Voltage Constant Frequency) is installed in the disk array unit 10.

(2) Second Exemplary Embodiment

Although in the first exemplary embodiment, the autonomous power supply control unit 11 is independent, the configuration of the storage system 1 is not limited to this configuration. In the second exemplary embodiment, the autonomous power supply control unit 11 is incorporated in the disk array unit 10.

In this embodiment, the microprocessor 25 of the disk array unit 10 performs a processing (FIG. 3) of the case where the AC electric power is disconnected from the aforementioned distribution board 12.

That is, when the electric power supply from the distribution board 12 is disconnected, the microprocessor 25 starts the electric power supply from the storage battery 42. When the notification of fault was received from the host devices 14 and/or the network device 17, the microprocessor 25 saves the data stored in the cache memory 28 to the recording medium 29 by the electric power supplied from the storage battery 42. And when the saving of the data has completed, the microprocessor 25 suspends the electric power supply from the storage battery 42.

Therefore, the autonomous power supply control unit 11 becomes unnecessary, the interface 18, the power cable 19, the microprocessor 41, and the memory 43 become unnecessary as a machine configuration. As a result, it is possible to reduce the number of the necessary device.

(3) The Third Exemplary Embodiment

The embodiment of the present invention may be applied to an appliance NAS (Network Attached Storage) device. In the appliance NAS device, the host device 14 of FIG. 1 is replaced with a NAS gateway or a NAS head. There are many configurations of the appliance NAS device where the host device 14 directly accesses the disk array unit 10 not through the network device 17.

In this case, the link-down of the host device 14 is detected by the host control part 24 of the array controller 21. In the case where the disk array unit 10 and the autonomous power supply control unit 11 are independent, the link down is informed to the autonomous power supply control unit 11 via the network 16. On the other hand, in the case where the autonomous power supply control unit 11 is incorporated in the disk array unit 10, all processing are performed in the array controller 21. Incidentally, a processing (FIG. 3) of a case where the AC electric power is disconnected from the distribution board 12 and a processing (FIG. 4) of the array controller 21 after receiving the notification of AC electric power disconnection are performed similarly with the first exemplary embodiment.

(4) The Forth Exemplary Embodiment

In the forth exemplary embodiment, the conventional original power supply control specification is incorporated in the storage system 1 of the first exemplary embodiment.

Figure 5:
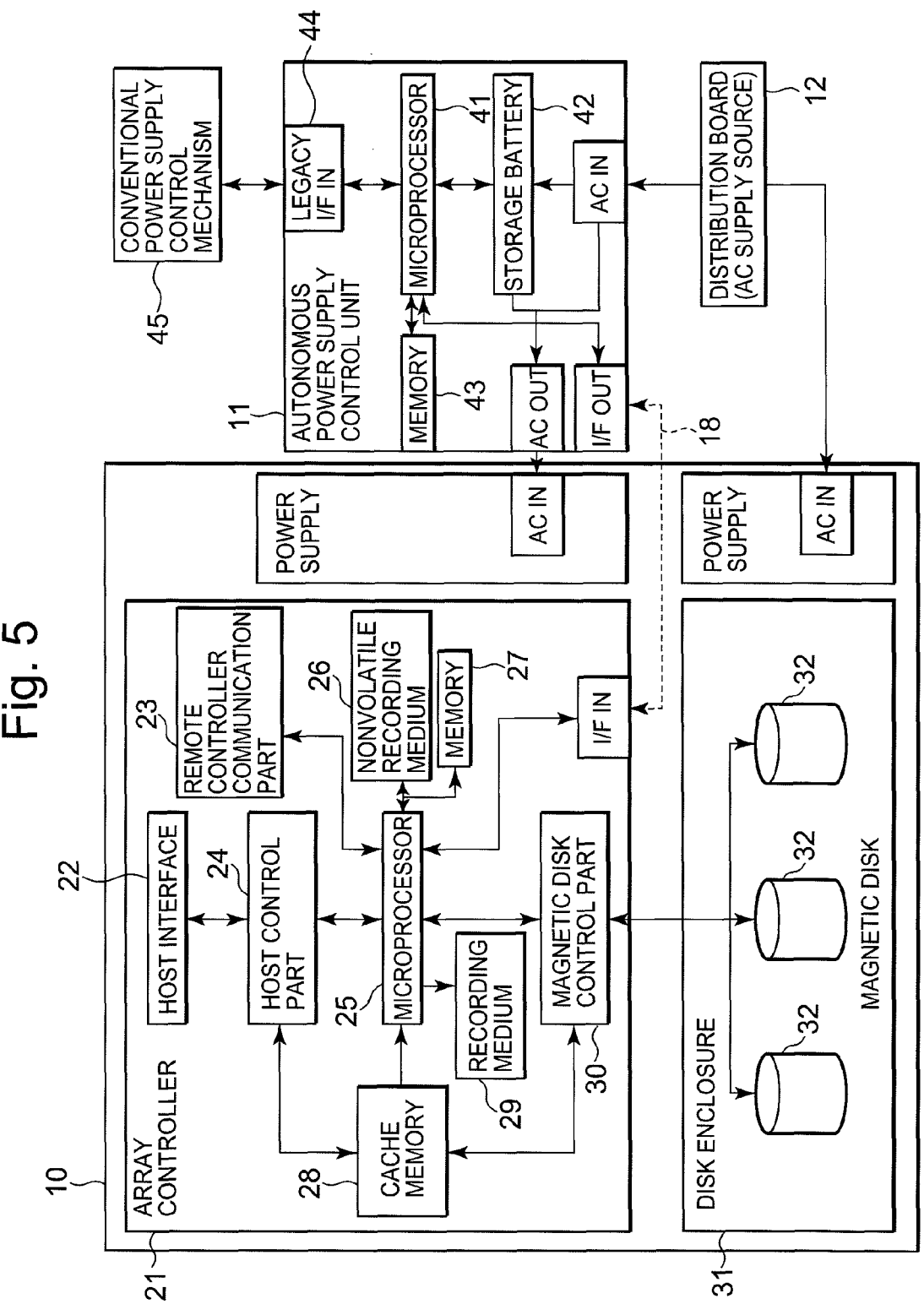
FIG. 5 is a block diagram showing a configuration of the disk array unit 10 and the autonomous power supply control unit 21 of the third exemplary embodiment of this invention.

FIG. 5 is a block diagram showing a configuration of the disk array unit 10 and the autonomous power supply control unit 21 of the forth exemplary embodiment of this invention. In this case, the storage system 1 is the same as the configuration of the storage system 1 of FIG. 2 except that the conventional power supply control mechanism 45 is connected to a legacy I/F in (LEGACY I/F IN) 44 of the autonomous power supply control unit 11.

Figure 6:
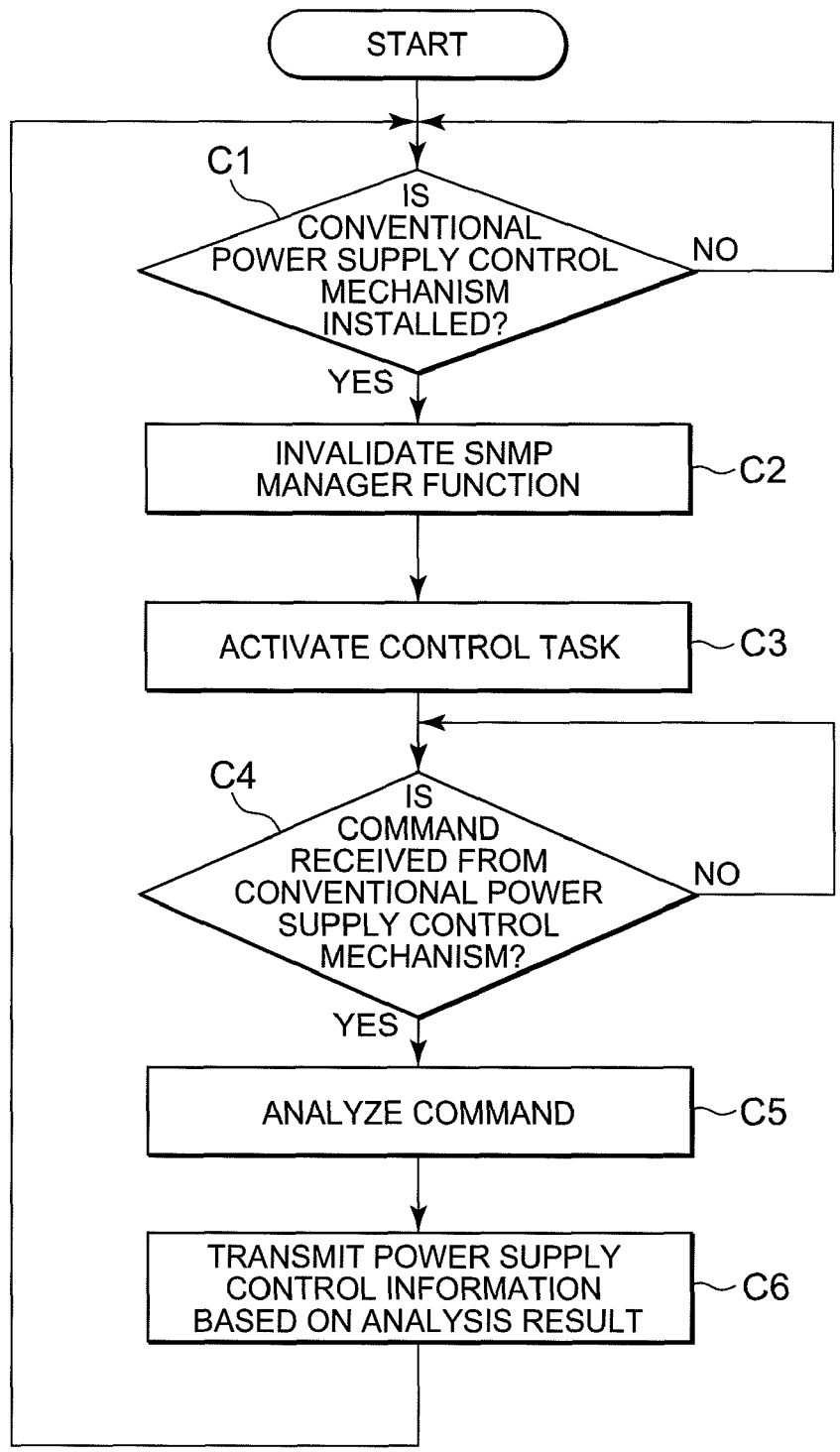
FIG. 6 is a flowchart showing a power supply control procedure when the power supply is controlled by the conventional power supply control mechanism in the forth exemplary embodiment.

Next, the power supply control method of this embodiment is explained with regard to a flowchart of FIG. 6. First, the autonomous power supply control unit 11 determines whether the conventional power supply control mechanism 45 is incorporated or not (Step C1). Subsequently, in the case where the conventional power supply control mechanism 45 is incorporated (Step C1: YES), the autonomous power supply control unit 11 invalidates the SNMP manager function (Step C2), and activates a control task for performing communication with the conventional power supply control mechanism 45 (Step C3).

Subsequently, the autonomous power supply control unit 11 determines whether the command was received from the conventional power supply control mechanism 45 (Step C4), if the command was received (Step C4: YES), the autonomous power supply control unit 11 will analyze contents of the command (Step C5), and will transmit power supply control information based on the analysis result to the array controller 21 (Step C6).

For example, if the command from the conventional power supply control mechanism 45 is an AC electric power disconnection command indicating that electric power from the distribution board 12 is disconnected, the autonomous power supply control unit 11 transmits to the array controller 21 the power supply control information corresponding to the notification of AC electric power disconnection.

Thereby, also in the storage system which has the conventional original power supply control specification, the autonomous power supply control unit 11 can perform the power supply control. Thus, in the storage system 1, the legacy I/F in 44 is incorporated in the autonomous power supply control unit 11 in order to connect with the conventional power supply control mechanism 45. As a result, it is possible for the autonomous power supply control unit 11 to interpret a command of the original mechanism 45 whose specification is disclosed and to perform the power supply control.

The embodiments of the present invention are usable not only in the disk array unit 10 but also in electric power control of a host-SAN switch-disk array unit in a data storage dedicated network (FC-SAN, IP-SAN), an NAS device for a file server, and whole peripheral devices connected to the host devices.

While the embodiments of this invention have been described in conjunction with the preferred embodiments described above, it will now be possible for those skilled in the art to put this invention into practice in various other manners.

What is claimed is:

1. A power supply control device comprising:
a power supply control unit configured to control electric power supplied from a first power supply device to a disk array device which is accessible from a plurality of host devices through a network device and from the power supply control device, at least two of the plurality of host devices operate with different power supply control specifications, and
a second power supply device configured to supply electric power to the disk array device and the power supply control device when the electric power supply from the first power supply device is disconnected,
wherein the power supply control unit comprises:
a collecting unit configured to collect power supply fault information indicating a power supply failure of at least one of the plurality of host devices and the network device, wherein the power supply fault information is transferred according to a management control protocol which controls both the plurality of host devices and the network device;
a starting unit configured to start the supply of the electric power from the second power supply device when the electric power supplied from the first power supply device is disconnected; and
a transmitting unit configured to transmit a notification to the disk array device in response to the collection of the power supply fault information according to the management control protocol after starting the electric power supply from the second power supply device, wherein the notification indicates that the electric power supplied from the first power supply device is disconnected, wherein, if the power supply control unit does not receive the power supply fault information from said at least one of the plurality of host devices and the network device within a predetermined time elapsing, the transmitting unit transmits the notification to the disk array unit, and wherein the predetermined time is determined based on at least one of: a power consumption of the disk array unit, a capacity of the second power supply device, a capacity of a cache memory of the disk array unit, and a transfer rate at which data in the cache memory is saved to a predetermined storage area in the disk array unit.

2. The power supply control device according to claim 1, wherein the management control protocol is the simple network management protocol (SNMP).

3. The power supply control device according to claim 2, wherein the power supply control specification of at least one of the host devices is different from the power supply control specification for another one of the plurality of host devices.

4. A storage system comprising: the power supply control device according to claim 1 and the disk array device, wherein, if the power supply control unit does not receive the power supply fault information from at least one of the plurality of host devices and the network device within a predetermined time elapsing, the transmitting unit transmits the notification to the desk array unit, and wherein the predetermined time is determined based on at least one of: a power consumption of the disk array unit, a capacity of a cache memory of the click array unit, and a transfer rate at which data in the cache memory is saved to a predetermined storage area of the disk array unit.

5. The storage system according to claim 4, wherein the management control protocol is the simple network management protocol (SNMP).

6. The storage system according to claim 4, wherein the disk array device comprises a first controller and a plurality of disks, wherein the first controller comprises:

a host control unit configured to collect I/O (Input/Output) commands from the plurality of host devices;

a disk control unit configured to control transmission/reception of data with the disks;

a cache memory which temporarily stores the data; and a control unit configured to control the host control unit, the disk control unit and the cache memory, and wherein the control unit comprises:

a processing unit configured to process the I/O commands which the host control unit has collected when the notification is received, a stopping unit configured to stop power supplied from the second power supply device after all the I/O commands the processing unit has collected have been processed, a saving unit configured to save the data stored in the cache memory to a predetermined recording medium in the disk array device after the stopping unit stops the power supply from the second power supply device to the host control unit and the disk control unit, and a notification unit configured to transmit a request for stopping the power supply from the second power supply device to the disk array devices in response to saving the data stored in the cache memory to the disk array device.

7. The storage system according to claim 4, wherein the disk array device comprises a second controller which is redundant to the first controller, wherein the control unit checks whether the second controller receives the notification from the transmitting unit, and transmits a request to the power supply control device to stop the power supply from the second power supply device to the disk array devices if the second controller does not receive the notification from the transmitting unit within the predetermined time.

8. A power supply control method of a power supply control device, comprising:

controlling electric power supplied from a first power supply device to a disk array device which is accessible from a plurality of host devices through a network device and from the power supply control device, at least two of the plurality of host devices operate with different power supply control specifications, in a power supply control step, and supplying electric power to the disk array device and the power supply control device when the electric power supply from the first power supply device is disconnected in a second power supply steps, wherein the power supply control step comprises:

collecting power supply fault information indicating a power supply failure of at least one of the plurality of host devices and the network device in a collecting step, wherein the power supply fault information is transferred according to a management control protocol which controls both the plurality of host devices and the network device;

starting the supply of the electric power from the second power supply device when the electric power supplied from the first power supply device is disconnected in a starting step; and transmitting a notification to the disk array device in response to the collection of the power supply fault information according to the management control protocol after starting the electric power supply from the second power supply device in a transmitting step, wherein the notification indicates that the electric power supplied from the first power supply device is disconnected, wherein, if the power supply fault information is not received from said at least one of the plurality of host devices and the network device within a predetermined time elapsing in the collecting step, the notification is transmitted to the disk array unit in the transmitting step, and wherein the predetermined time is determined based on at least one of: a power consumption of the disk array unit, a capacity of the second power supply device, a capacity of a cache memory of the disk array unit, and a transfer rate at which data in the cache memory is saved to a predetermined storage area in the disk array unit.

9. The power supply control method according to claim 8, wherein the management control protocol is the simple network management protocol (SNMP).

10. The power supply control method according to claim 9, wherein the power supply control specification of at least one of the host devices is different from the power supply control specification for another one of the plurality of host devices.

11. A control method of a disk array device, wherein the disk array device comprises a first controller and a plurality of disks and is connected to a power supply control device which controls a first power supply device and a second power supply device, comprising:

a host control unit collecting I/O (Input/Output) commands from a plurality of host devices;
a disk control unit controlling transmission/reception of the data with the disks;
storing the data in a cache memory; and
processing the I/O commands which the host control unit has collected when the notification is received from the power supply control device, wherein the notification indicates that the electric power supplied from the first power supply device is disconnected,
stopping power supplied from the second power supply device to the host control unit and the disk control unit after all the I/O commands the processing unit has collected have been processed, in a stopping step,
saving the data stored in the cache memory to a predetermined recording medium in the disk array device after the stopping step, and
transmitting a request to the power supply control device, wherein the request is for stopping the power supply from the second power supply device to the disk array devices in response to saving the data stored in the cache memory to the disk array unit,
Wherein the disk array unit comprises a second controller which is redundant to the first controller, comprising:
checking whether the second controller receives the notification from the power supply control device, and transmits the request to the power supply control device to stop the power supply from the second power supply device to the disk array units if the second controller does not receive the notification within the predetermined time.

12. A computer readable non-transitory medium recording thereon a program for enabling computer to execute a power supply control method of a power supply control device, the power supply control method comprising:
controlling electric power supplied from a first power supply device to a disk array device which is accessible from a plurality of host devices through a network device and from the power supply control device, at least two of the plurality of host devices operate with different power supply control specifications, in a power supply control step, and
supplying electric power to the disk array device and the power supply control device when the electric power supply from the first power supply device is disconnected in a second power supply steps,
wherein the power supply control step comprises:
collecting power supply fault information indicating a power supply failure of at least one of the plurality of host devices and the network device in a collecting step, wherein the power supply fault information is transferred according to a management control protocol which controls both the plurality of host devices and the network device;
starting the supply of the electric power from the second power supply device when the electric power supplied from the first power supply device is disconnected in a starting step; and
transmitting a notification to the disk array device in response to the collection of the power supply fault information according to the management control protocol after starting the electric power supply from the second power supply device in a transmitting step, wherein the notification indicates that the electric power supplied from the first power supply device is disconnected,
wherein, if the power supply fault information is not received from said at least one of the plurality of host devices and the network device within a predetermined time elapsing in the collecting step, the notification is transmitted to the disk array unit in the transmitting step, and
wherein the predetermined time is determined based on at least one of: a power consumption of the disk array unit, a capacity of the second power supply device, a capacity of a cache memory of the disk array unit, and a transfer rate at which data in the cache memory is saved to a predetermined storage area in the disk array unit.

13. The computer readable medium according to claim 12, wherein the management control protocol is the simple network management protocol (SNMP).

14. The computer readable non-transitory medium according to claim 12, wherein the power supply control specification of at least one of the host devices is different from the power supply control specification for another one of the plurality of host devices.

15. A computer readable non-transitory medium recording thereon a program for enabling computer to execute a control method of a disk array device, wherein the disk array device comprises a first controller and a plurality of disks and is connected to a power supply control device which controls a first power supply device and a second power supply device, comprising:
a host control unit collecting I/O (Input/Output) commands from a plurality of host devices;
a disk control unit controlling transmission/reception of the data with the disks;
storing the data in a cache memory; and
processing the I/O commands which the host control unit has collected when the notification is received from the power supply control device, wherein the notification indicates that the electric power supplied from the first power supply device is disconnected,
stopping power supplied from the second power supply device to the host control unit and the disk control unit after all the I/O commands the processing unit has collected have been processed, in a stopping step,
saving the data stored in the cache memory to a predetermined recording medium in the disk array device after the stopping step, and
transmitting a request to the power supply control device, wherein the request is for stopping the power supply from the second power supply device to the disk array devices in response to saving the data stored in the cache memory to the disk array unit,
Wherein the disk array unit comprises a second controller which is redundant to the first controller, comprising:
Checking whether the second controller receives the notification from the power supply control device, and transmits the request to the power supply control device to stop the power supply from the second power supply device to the disk array unit of the second controller does not receive the notification within the predetermined time.

16. A power supply control device comprising:
a power supply control means for controlling electric power supplied from a first power supply device to a disk array device which is accessible from a plurality of host devices through a network device and from the power supply control device, at least two of the plurality of host devices operate with different power supply control specifications, and a second power supply device configured to supply electric power to the disk array device and the power supply control device when the electric power supply from the first power supply device is disconnected, wherein the power supply control means comprises:

a collecting means for collecting power supply fault information indicating a power supply failure of at least one of the plurality of host devices and the network device, wherein the power supply fault information is transferred according to a management control protocol which controls both the plurality of host devices and the network device;

a starting means for starting the supply of the electric power from the second power supply device when the electric power supplied from the first power supply device is disconnected; and a transmitting means for transmitting a notification to the disk array device in response to the collection of the power supply fault information according to the management control protocol after starting the electric power supply from the second power supply device, wherein the notification indicates that the electric power supplied from the first power supply device is disconnected wherein, if the power supply control means does not receive the power supply fault information from said at least one of the plurality of host devices and the network device within a predetermined time elapsing, the transmitting means transmits the notification to the disk array unit, and wherein the predetermined time is determined based on at least one of: a power consumption of the disk array unit, a capacity of the second power supply device, a capacity of a cache memory of the disk array unit, and a transfer rate at which data in the cache memory is saved to a predetermined storage area in the disk array unit.

17. The power supply control device according to claim 16, wherein the management control protocol is the simple network management protocol (SNMP).

18. The power supply control device according to claim 17, wherein the power supply control specification of at least one of the host devices is different from the power supply control specification for another one of the plurality of host devices.

19. A storage system comprising: the power supply control device according to claim 16 and the disk array unit, wherein, if the power supply control means does not receive the power supply fault information from at least one of the plurality of host devices and the network device within a predetermined time elapsing, the transmitting means transmits the notification to the disk array unit, and wherein the predetermined time is determined based on at least one of: a power consumption of the disk array unit, a capacity of the second power supply device, a capacity of a cache memory of the disk array unit, and a transfer rate at which data in the cache memory is saved to a predetermined storage area of the disk array unit.

20. The storage system according to claim 19, wherein the management control protocol is the simple network management protocol (SNMP).

21. The storage system according to claim 19, wherein the disk array device comprises a first controller and a plurality of disks, wherein the first controller comprises:

a host control unit configured to collect I/O (Input/Output) commands from the plurality of host devices;

a disk control unit configured to control transmission/reception of data with the disks;

a cache memory which temporarily stores the data; and a control means for controlling the host control unit, the disk control unit and the cache memory, and wherein the control means comprises:

a processing means for processing the I/O commands which the host control unit has collected when the notification is received, a stopping means for stopping power supplied from the second power supply device after all the I/O commands the processing unit has collected have been processed, a saving means for saving the data stored in the cache memory to a predetermined recording medium in the disk array device after the stopping means stops the power supply from the second power supply device to the host control unit and the disk control unit, and a notification means for transmitting a request for stopping the power supply from the second power supply device to the disk array devices in response to saving the data stored in the cache memory to the disk array unit, Wherein the disk array unit comprises a second controller which is redundant to the first controller, Wherein the control means checks whether the second controller receives the notification from the transmitting means, and transmits a request to the power supply control device to stop the power supply from the second power supply device to the disk array units if the second controller does not receive the notification form the transmitting means within the predetermined time.

* * * * *